April 5, 1960   O. R. BRINEY, JR., ET AL   2,931,254
BORING HEAD
Filed Oct. 14, 1957
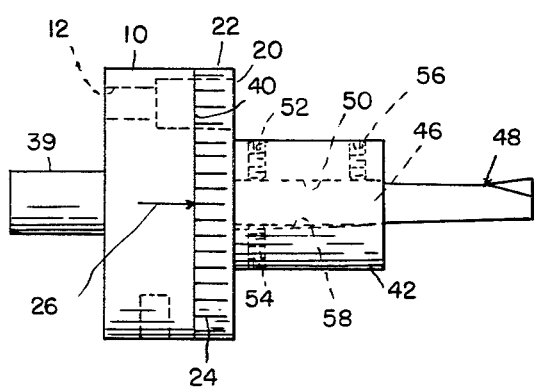
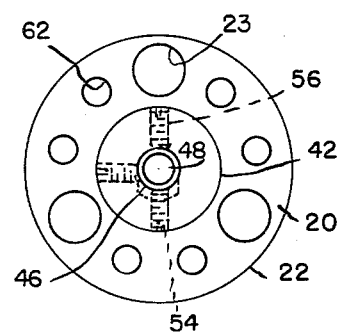
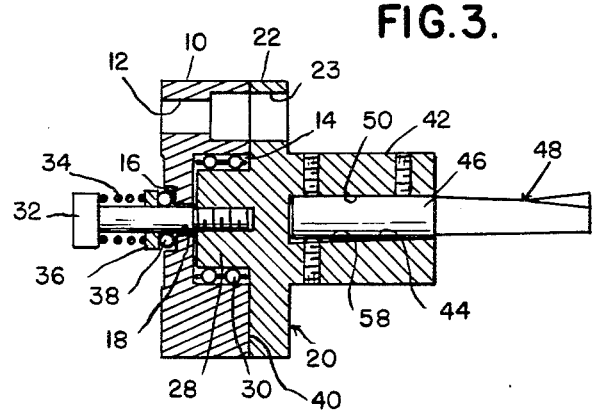
INVENTORS
OTTIS R. BRINEY JR.
JAMES W. BRINEY
BY
Whittemore,
Hulbert & Belknap
ATTORNEYS

United States Patent Office

2,931,254
Patented Apr. 5, 1960

2,931,254

BORING HEAD

Ottis R. Briney, Jr., and James W. Briney, Pontiac, Mich., assignors to Briney Manufacturing Co., Pontiac, Mich., a corporation of Michigan Application October 14, 1957, Serial No. 689,893

2 Claims. (Cl. 77—58)

The present invention relates to a boring head, and more particularly to one specially designed for small holes.

It is an object of the present invention to provide a boring head in which a boring bar is adjustable by adjustment of the bar in a bar receiving recess and also by angular adjustment between parts of the head.

It is a further object of the present invention to provide a boring head having an inwardly enlarged bar receiving recess in which a boring bar is adjustably received, one side of the recess having a surface composed of elements parallel to the axis of the head for initial location of the boring bar together with radially adjustable bar clamping means extending into the recess.

Other objects and features of the invention will become apparent as the description proceeds, especially when taken in conjunction with the accompanying drawing, illustrating a preferred embodiment of the invention, wherein:

Figure 1 is a side elevation of the boring head.

Figure 2 is an end elevation of the boring head.

Figure 3 is a longitudinal sectional view through the boring head.

The boring head comprises an adaptor 10 adapted to be secured concentrically with respect to a driving spindle by bolts extending through bolt receiving openings 12. Alternatively, the adaptor 10 may be fixedly mounted on a stationary support and the relative rotation between the boring bar and the work piece provided by rotating the work piece. At the outer side the adaptor 10 is provided with a cylindrical recess 14 which is located eccentrically with respect to the axis of the adaptor. The amount of eccentricity is very small as for example about .003 inch. At its rear surface the adaptor 10 is provided with a shallow recessed seat 16. An opening 18 extends through the adaptor interconnecting the seat 16 and recess 14.

Rotatably associated with the adaptor is a bar holder 20 having a radial flange portion 22 provided with openings 23 adapted to be turned into registration with the bolt receiving openings 12. The flange 22 is provided with indicia as indicated at 24 for cooperation with a gauge mark 26 provided on the side of the adaptor 10. The bar holder 20 has a cylindrical rearwardly extending projection 28 adapted to be received in the recess 14 and dimensioned with respect thereto so as to preload a series of balls 30.

Extending through the opening 18 is a screw 32 having an enlarged head forming a seat for a compression spring 34, the other end of which engages a thrust washer 36 which in turn engages thrust balls 38. The spring and screw assembly is covered by a cap or shell 39, as seen in Figure 1. The spring causes the bar holder to be pressed firmly against the outer flat supporting and locating surface 40 of the adaptor.

Located centrally in a forwardly projecting extension 42 of the bar holder is a bar receiving recess 44. The recess is dimensioned at its forward end to receive the shank 46 of a boring bar 48. The recess 44 is rearwardly enlarged. One surface thereof, as for example the surface 50 seen in Figure 1, is composed of straight elements parallel to the axis of the boring head. This surface is intended to be engaged by the shank of the boring bar and to serve as a locating surface when a new boring bar is inserted in the holder. The boring bar is rigidly clamped in operating position by set screws indicated generally at 52, 54 and 56.

One of the surfaces of the recess 48 is inclined as indicated at 58 to provide for angular adjustment of the boring bar and particularly, in a direction to advance its cutting surface radially outwardly from its axis.

The preloaded balls 30 and the spring pressed balls 38 in conjunction with the engagement of the bar holder with the surface 40 of the adaptor, support the bar holder firmly in operating position against any forces which may be developed during the cutting operation and transmitted to the bar holder through the boring bar. However, forces applied to the periphery of the flange 22 or to the spanner wrench receiving openings 62 are effective to rotate the bar holder 20 and thus effect an extremely fine and accurate adjustment of the boring bar relative to the spindle or drive shaft on which the adaptor 10 is mounted. This adjustment may take place without disturbing the setup in any way and the boring bar remains exactly in its new position when the bar holder is released.

Inasmuch as the amount of eccentricity of the recess 14 is extremely small, the amount of adjustment which may be accomplished by rotation of the bar holder in the adaptor is relatively small. However, larger adjustments may be readily accomplished by movement of the shank of the boring bar in the recess 44 which of course is accomplished by backing off on the screw 54 and correspondingly advancing the screw 52 for example, thus in effect angularly adjusting the boring bar about an axis located approximately at the inner end of the screw 56 as seen in Figure 1.

The drawing and the foregoing specification constitute a description of the improved boring head in such full, clear, concise and exact terms as to enable any person skilled in the art to practice the invention, the scope of which is indicated by the appended claims.

What we claim as our invention is:

1. A boring bar construction, comprising an adapter for connection to a driving spindle, a bar holder for adjustably holding a boring bar, and means for connecting said adapter and bar holder for relative rotational movement while preventing relative axial movement therebetween, said connecting means including resilient means acting between said adapter and bar holder tending to bias said adapter and bar holder toward each other, said adapter having an eccentric cylindrical recess containing ball bearings in one end thereof, said bar holder being cylindrical with a radially extending flange near one end thereof adapted to rotatably seat on said one end of said adapter with said one end of the bar holder positioned within said eccentric cylindrical recess, said one end of said bar holder being adapted to preload said ball bearings within said eccentric recess, whereby fine radial adjustment of a boring bar held concentrically by said bar holder may be accomplished, without the necessity of loosening clamping members, by means of rotating the bar holder with respect to the adapter in said eccentric recess, said bar holder having a recess concentric with the axis of the bar holder in the other end thereof adapted to receive a boring bar therein, the outer edge of the boring bar receiving recess being adapted to closely surround a boring bar received therein, said boring bar receiving recess having a locating surface therein parallel to the axis of the bar holder for similarly locating different boring bars on initial insertion thereof in the boring bar receiving recess, said boring bar receiving recess also having a surface therein diverging from said locating surface inwardly of said recess to permit angular pivoting of the axis of a boring bar received in the boring bar receiving recess about the outer edge of said boring bar receiving recess, and means mounted within said bar holder and engaging the boring bar for pivotally adjusting the axis of the boring bar about said outer edge of said boring bar receiving recess whereby coarse radial adjustment of said boring bar may be accomplished comprising a pair of screws oppositely located laterally of said boring bar receiving recess and extending laterally into the boring bar receiving recess at the inner end thereof through said locating and diverging side thereof to engage the shank end of a boring bar within the boring bar receiving recess, said screws being operable on axial movement thereof laterally of said boring bar receiving recess to angularly adjust the axis of the boring bar about said outer edge of said boring bar receiving recess.

2. Structure as claimed in claim 1 wherein a further screw is provided extending laterally through the locating side of the boring bar receiving recess of the bar holder adjacent the outer edge of the boring bar receiving recess.

References Cited in the file of this patent

UNITED STATES PATENTS

| | | |
|---|---|---|
| 1,493,051 | O'Brien | May 6, 1924 |
| 1,935,493 | Wellington | Nov. 14, 1933 |
| 2,369,875 | Wanelik | Feb. 20, 1945 |
| 2,435,396 | Koch | Feb. 3, 1948 |
| 2,693,965 | Briney | Nov. 9, 1954 |
| 2,780,467 | Jackson | Feb. 5, 1957 |

FOREIGN PATENTS

| | | |
|---|---|---|
| 62,214 | Norway | Mar. 18, 1940 |